(No Model.) 2 Sheets—Sheet 1.
G. H. BENJAMIN.
HEATING APPARATUS.
No. 369,425. Patented Sept. 6, 1887.
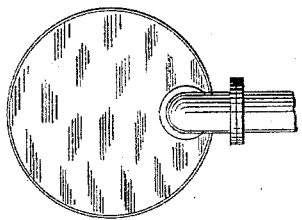
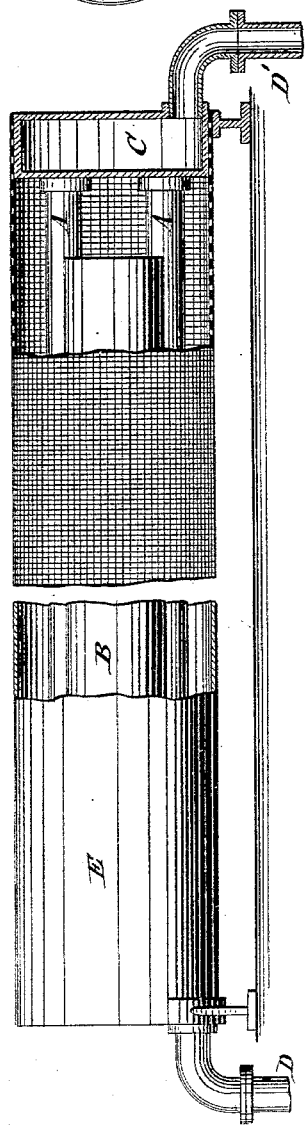
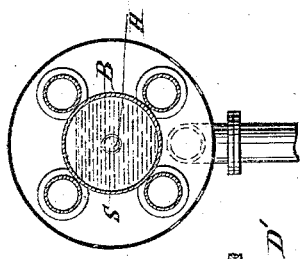
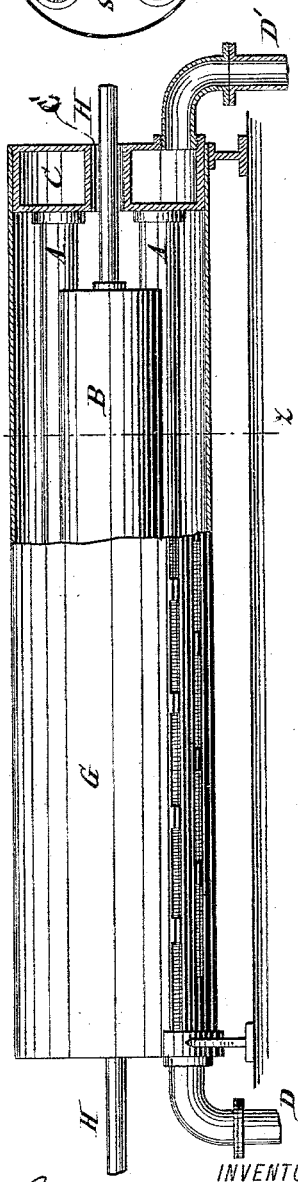
WITNESSES:
INVENTOR

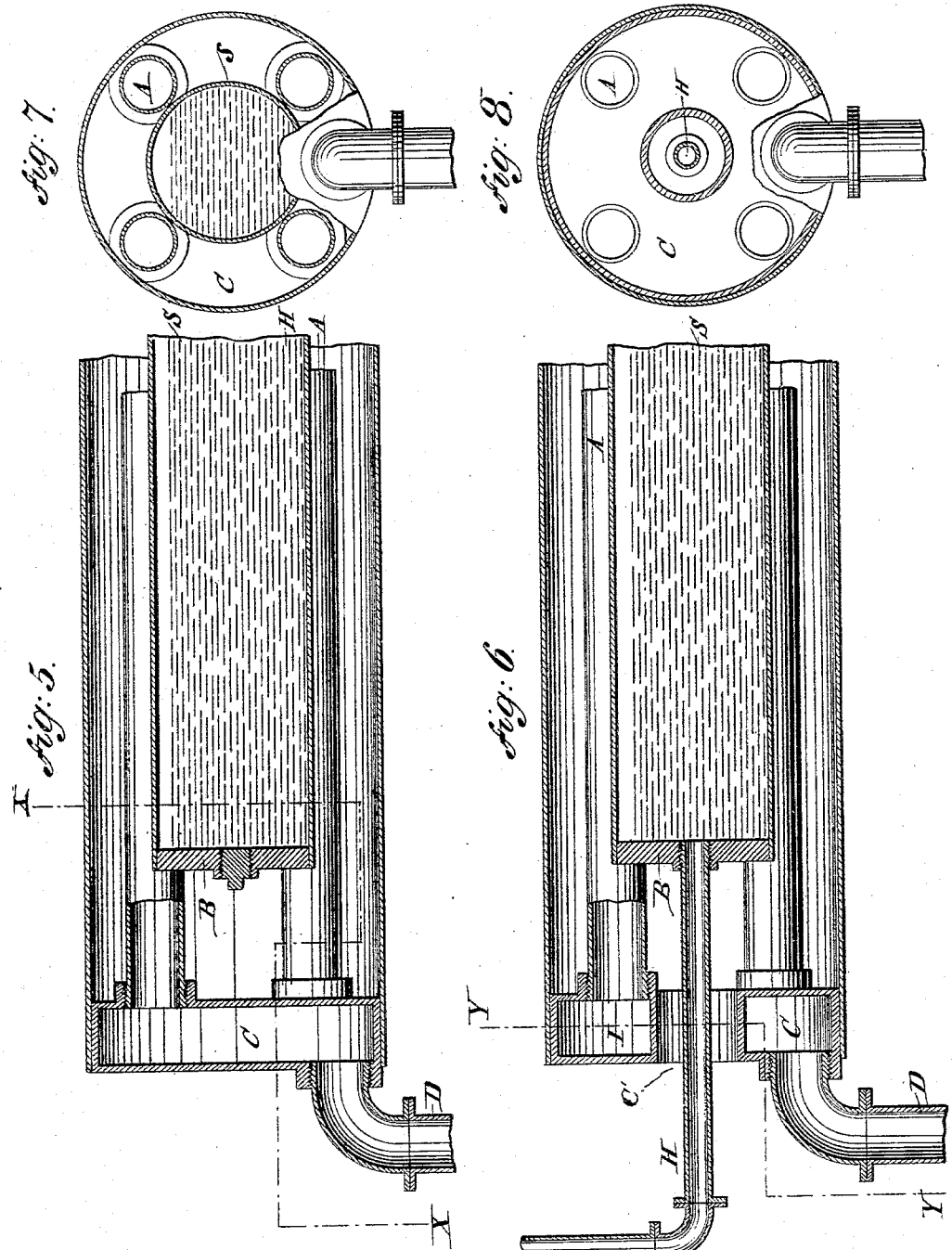

UNITED STATES PATENT OFFICE.

GEORGE H. BENJAMIN, OF NEW YORK, N. Y.

HEATING APPARATUS.

SPECIFICATION forming part of Letters Patent No. 369,425, dated September 6, 1887.

Application filed April 6, 1887. Serial No. 233,940. (No model.)

*To all whom it may concern:*

Be it known that I, GEORGE H. BENJAMIN, a resident of the city, county, and State of New York, have invented certain new and useful Improvements in Heating Apparatus, of which the following is a specification.

My invention relates to heating apparatus of the class more especially adapted for use upon railway-cars or similar vehicles, although applicable for heating purposes generally.

My invention consists in combining with a series of pipes adapted to convey live or exhaust steam, and primarily generated in any suitable boiler, a pipe or pipes located in the immediate proximity of said steam-conveying pipes and adapted to contain a stationary or circulating body of non-freezing liquid such as will absorb the heat of the steam and subsequently radiate the heat so acquired. By means of such an apparatus and the contained body of liquid I may store a portion of the heat derived from steam generated, for instance, in the boiler of a locomotive-engine attached to a train of cars which are primarily heated by the direct radiation of the steam and have the stored heat available as a secondary source of heat to maintain for a time the temperature of such cars should the primary source of heat—i. e., the steam—be by any reason rendered unavailable.

In the accompanying drawings, which illustrate my invention, similar letters of reference indicate like parts.

Figure 1 is a longitudinal elevation of my improved device, showing the arrangement of the steam-pipes and the sealed fluid-drum as regards each other. The inclosing-cover for the pipes is shown broken away and made either of sheet metal or wire-gauze. Fig. 2 is a similar view, and shows in place of the sealed fluid-drum a pipe or drum through which a liquid may be made to circulate. The inclosing-cover for the pipes is shown perforated along its base. Figs. 3 and 4 are respectively an end view of Fig. 1 and a section on the line Z Z of Fig. 2. Figs. 5 and 6 are longitudinal sections of Figs. 1 and 2, one of the steam-pipes also being shown partially in section. Figs. 7 and 8 are respectively transverse sections on the line X X of Fig. 5 and Y Y of Fig. 6.

In the drawings four steam pipes, A, are shown arranged parallel to each other and so as to include between them a drum, B, adapted to contain a non-freezing liquid or body, S, and preferably a liquid having large storage capacity for heat. Thus I may use a solution of the acetate of soda or potash or of any other neutral or analogous salt. A solution of chloride of sodium in water does well enough for all ordinary purposes. The drum is adapted to be hermetically sealed for the purpose of preventing the evaporation of the liquid when heated.

Where a solid material is employed in the drum, dry sand will be found to be as useful as any other substance for the purpose of absorbing heat.

The steam-pipes A are threaded on their ends, and are screwed into the tapped holes in the cored boxes C at either end.

D is a steam-pipe connected to one of the boxes and to a main steam-pipe from the source of steam-supply, or it may be connected directly to the source of supply. The source of supply may be any suitable portable or stationary boiler, and I may use live or exhaust steam, as is most convenient.

D' is a pipe connected to a steam-trap or to a return-pipe to the boiler, so that the water of condensation may be conveyed from the steam-spaces. The steam-pipes A, which may be of any convenient number and arranged in any suitable manner external to the drum B, are shown as inclosed in a sheet-metal covering, E, the object of which is to confine the radiated heat from the steam-pipes A to the vicinity of the drum B. The water in the drum is thus heated much more quickly than where a wire-gauze, F, or perforated metal covering G is employed, although both of the latter may be used to advantage to create a circulation of air, and so promote ventilation.

In placing my improved heater upon cars running over a long line of road, and which are likely to be detained by accident or snow-blockade, I prefer to so arrange the drums B that the liquid may be made to circulate throughout the pipe system of the car when influenced by heat generated in any suitable device in the car or under it and independently of the steam system—as, for instance, by a stove. Figs. 2 to 6 show such an arrangement as far as the drum is concerned.

The connection and arrangement of the system of piping with an auxiliary heater is not described in this specification, as it forms the subject of a separate application for Letters Patent made by me and filed simultaneously herewith.

To the drum B are connected the pipes H H', which pass through the openings C' of the boxes C, the steam-space I being annular in shape when the boxes C are so formed. The pipes H may, as stated, be connected to any suitable heating device. I prefer, however, to use a stove and equalizing-reservoir of the well-known "Baker type."

By means of the arrangement of pipes as described all questions of expansion and contraction between the pipes conveying the steam and the drum containing the liquid are eliminated. The drum is free to move on the steam-pipes and the pipes on the drum.

The operation of the device is simple. The heat of the steam circulating in the pipes A is partially radiated throughout the space to be heated and partially absorbed by the fluid S in the drum. The fluid in the drum, when adapted to circulate, is set in motion by the acquired heat from the steam, or from the stove or heating device in connection with the drum.

Thus it will be observed that when the steam-supply is cut off, the heat absorbed by the liquid will be radiated throughout the car and will serve to maintain the temperature of the car for a considerable time, the length of time within which the heat will be radiated depending upon the rate of and capacity for heat-storage of the fluid in the drum.

I am aware that a hermetically-sealed pipe containing a solution of a salt has been inclosed in a larger pipe through which steam was conducted, and such I do not claim.

I claim as my invention—

1. An improved heater comprising a vessel charged with a heat-absorbing material, and two or more tubes arranged concentrically without and in close relation to said vessel and adapted to transmit steam or other heating-fluid, substantially as described.

2. An improved heater comprising a vessel charged with a heat-absorbing material, two or more tubes in close relation to said vessel adapted to receive steam or other heating-fluid, and an inclosing-tube within which said vessel and tubes are located, substantially as described.

3. An improved heater comprising a vessel charged with a heat-absorbing material, two or more tubes in close relation to said vessel adapted to receive steam or other heating-fluid, and an inclosing perforated covering therefor, substantially as described.

4. An improved heater comprising a vessel charged with a heat-absorbing material, two or more tubes in close relation with said vessel, and hollow coupling-boxes for connecting said tubes together, said tubes and boxes adapted to receive steam or other heating-fluid, substantially as described.

5. An improved heater comprising a vessel charged with a circulating heat-absorbing material, two or more tubes in close relation with said vessel, coupling-boxes for connecting said tubes together, provided with annular steam-spaces, and openings through the body thereof for the passage of the pipes connected with the vessel containing the heat-absorbing material, said tubes and boxes adapted to receive steam or other heating-fluid, substantially as described.

In witness whereof I have hereunto set my hand this 4th day of March, 1887.

GEO. H. BENJAMIN.

Witnesses:
TRAJANO G. TORRES,
JAMES F. FOGERTY.